(12) United States Patent
Gardt et al.

(10) Patent No.: US 11,161,490 B2
(45) Date of Patent: Nov. 2, 2021

(54) VALVE ASSEMBLY, BRAKE SYSTEM AND METHOD FOR OPERATING A VALVE ASSEMBLY

(71) Applicant: Robert Bosch GmbH, Stuttgart (DE)

(72) Inventors: Andrej Gardt, Abstatt (DE);
Christoph Eisele, Heilbronn (DE);
Valentin Schubitschew, Tamm (DE);
Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/347,081

(22) PCT Filed: Oct. 5, 2017

(86) PCT No.: PCT/EP2017/075301
§ 371 (c)(1),
(2) Date: May 2, 2019

(87) PCT Pub. No.: WO2018/091198
PCT Pub. Date: May 24, 2018

(65) Prior Publication Data
US 2019/0263370 A1    Aug. 29, 2019

(30) Foreign Application Priority Data
Nov. 16, 2016  (DE) .......................... 102016222576.6

(51) Int. Cl.
*B60T 8/40* (2006.01)
*B60T 7/04* (2006.01)
(Continued)

(52) U.S. Cl.
CPC .............. *B60T 8/4086* (2013.01); *B60T 7/04* (2013.01); *B60T 7/042* (2013.01); *B60T 8/409* (2013.01);
(Continued)

(58) Field of Classification Search
CPC ......... F16K 15/142; G05D 7/005; B60T 7/04; B60T 7/042; B60T 8/88; B60T 8/267;
(Continued)

(56) References Cited

U.S. PATENT DOCUMENTS 5,941,608 A * 8/1999 Campau ................. B60T 7/042
303/113.4
6,135,572 A * 10/2000 Worsdorfer ............ B60T 7/042
303/10
(Continued)

FOREIGN PATENT DOCUMENTS

CN       1561299 A    1/2005
CN    101065276 A   10/2007
(Continued)

OTHER PUBLICATIONS

International Search Report dated Jan. 15, 2018 of the corresponding International Application PCT/EP2017/075301 filed Oct. 5, 2017.

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A valve assembly, for controlling a fluidic connection between a brake master cylinder and a pedal simulator of a brake system of a motor vehicle, includes a first control valve and a second control valve, the second control vale being positioned between the first control valve and a pedal simulator and including first and second flow controllers to control flow volumes of hydraulic fluid that differ between first and second flow directions.

22 Claims, 3 Drawing Sheets

(51) Int. Cl.
*B60T 13/68* (2006.01)
*F16K 15/14* (2006.01)
*G05D 7/00* (2006.01)
*B60T 13/66* (2006.01)
*B60T 8/88* (2006.01)

(52) U.S. Cl.
CPC .............. *B60T 8/88* (2013.01); *B60T 13/662* (2013.01); *B60T 13/686* (2013.01); *F16K 15/142* (2013.01); *G05D 7/005* (2013.01); *B60T 8/4081* (2013.01)

(58) Field of Classification Search
CPC ...... B60T 8/409; B60T 8/3255; B60T 8/4081; B60T 8/4086; B60T 8/4827; B60T 13/16; B60T 13/74; B60T 13/662; B60T 17/221; Y10S 303/03
USPC .......................................... 188/152
See application file for complete search history.

(56) References Cited

U.S. PATENT DOCUMENTS

| | | | | |
|---|---|---|---|---|
| 6,547,342 | B1* | 4/2003 | Schaust | B60T 7/042 303/11 |
| 7,444,990 | B1 | 11/2008 | Fisher et al. | |
| 2010/0326778 | A1* | 12/2010 | Schriebl | B60T 8/4086 188/106 P |
| 2015/0110654 | A1* | 4/2015 | Bubb | F04B 13/00 417/435 |

FOREIGN PATENT DOCUMENTS

| | | |
|---|---|---|
| CN | 101274622 A | 10/2008 |
| CN | 103154531 A | 6/2013 |
| DE | 102007016867 A1 | 10/2008 |
| DE | 102010021935 A1 | 12/2010 |
| DE | 102012102088 A1 | 9/2013 |
| DE | 102012203258 A1 | 9/2013 |
| DE | 102013225470 A1 | 6/2015 |
| JP | 2011241904 A | 12/2011 |
| KR | 20140056049 A | 5/2014 |
| WO | 9812086 A1 | 3/1998 |

* cited by examiner

VALVE ASSEMBLY, BRAKE SYSTEM AND METHOD FOR OPERATING A VALVE ASSEMBLY

CROSS-REFERENCE TO RELATED APPLICATIONS

The present application is the national stage of International Pat. App. No. PCT/EP2017/075301 filed Oct. 5, 2017, and claims priority under 35 U.S.C. § 119 to DE 10 2016 222 576.6, filed in the Federal Republic of Germany on Nov. 16, 2016, the content of each of which are incorporated herein by reference in their entireties.

FIELD OF THE INVENTION

The present invention relates to a valve assembly for controlling a fluidic connection between a brake master cylinder and a pedal simulator of a brake system for a motor vehicle. The invention also relates to a brake system for a motor vehicle. In addition, the present invention relates to a method for operating a valve assembly for controlling a fluidic connection between a brake master cylinder and a pedal simulator of a brake system for a motor vehicle.

BACKGROUND

A control valve is used to control an intake or discharge of gases or fluids, or for the open and/or closed-loop control of a direction of flow. A conventional control valve for use in an integrated electronic-hydraulic brake system of a motor vehicle, which is disposed between a brake master cylinder and a pedal simulator, is formed by a directly controlled solenoid valve. In this connection, the solenoid valve has a preliminary-stage stroke and a main-stage stroke. The main-stage stroke is reduced by the preliminary-stage stroke, dependent on the flow. Greater flow rates are thereby obtained in the reverse direction, that is, from the pedal simulator to the brake master cylinder.

DE 10 2007 016 867 A1 describes a brake booster for a motor vehicle having a pedal simulator that is coupled to a brake pedal and having a transmitting device that is coupled to the piston of a brake master cylinder and is driven by a drive element to boost the braking force and an associated power brake system.

SUMMARY

The present invention provides a valve assembly for controlling a fluidic connection between a brake master cylinder and a pedal simulator of a brake system for a motor vehicle, having a first control valve which can be positioned between the brake master cylinder and the pedal simulator and is traversable by a hydraulic fluid in a first direction of flow or in a second direction of flow, and having a second control valve coupled to the first control valve, characterized in that the second control valve can be positioned between the first control valve and the pedal simulator, the second control valve having first and second flow controllers designed in each case to control a flow volume of the hydraulic fluid in the first direction of flow and in the second direction of flow.

The present invention further provides a brake system for a motor vehicle having a brake pedal coupled via a piston to a brake master cylinder, having a pedal simulator connected fluidically to the brake master cylinder, and having a valve assembly situated between the brake master cylinder and the pedal simulator.

In addition, the present invention provides a method for operating a valve assembly. The method includes provision of a first control valve between the brake master cylinder and the pedal simulator, a hydraulic fluid flowing through the first control valve in a first direction of flow or in a second direction of flow. The method further includes provision of a second control valve coupled to the first control valve, the second control valve being provided between the first control valve and the pedal simulator. In addition, the method includes control of a flow volume of the hydraulic fluid in the first direction of flow and in the second direction of flow through first and second flow controllers of the second control valve.

An idea of the present invention is to improve the feel of the brake pedal by providing the first and second flow controllers of the second control valve, which are designed to control a flow volume of the hydraulic fluid in the first direction of flow and in the second direction of flow.

Thus, for example, too rapid a return movement of the brake pedal can be prevented effectively if, e.g., a flow volume in the reverse direction, that is, in the second direction of flow from the pedal simulator in the direction of the brake master cylinder, is limited.

According to an example embodiment, the second control valve is disposed at a connection of the first control valve on the pedal-simulator side, or is integrated into a housing of the first control valve. A compact valve assembly can thus be achieved in advantageous fashion and the beneficial effects according to the present invention can be realized.

According to an example embodiment, the first and second flow controllers a of the second control valve for controlling the flow volume of the hydraulic fluid in the first direction of flow and in the second direction of flow are connected in parallel. Therefore, a flow volume through the first and second flow controllers of the second control valve can be controlled advantageously both in the first direction of flow and in the second direction of flow, preferably independently of each other or according to specific systemic and/or structural requirements.

According to an example embodiment, the first flow controller of the second control valve is formed by a non-return valve that has a sealing element acted upon by a spring device with a return force, the non-return valve being disposed in such a way that the spring device presses the sealing element against a valve seat of the second control valve. Thus, a controlled volume of hydraulic fluid is able to flow in the first direction of flow from the brake master cylinder in the direction of the pedal simulator, while a flow of the hydraulic fluid in the second direction of flow from the pedal simulator in the direction of the brake master cylinder through the non-return valve is prevented.

According to an example embodiment, given the presence of a positive differential pressure of the hydraulic fluid between a connection of the second control valve facing the first control valve and a connection of the second control valve facing the pedal simulator, the positive differential pressure being above a predetermined threshold value for opening the non-return valve, hydraulic fluid flows in the first direction of flow through the second control valve, and given the presence of a positive differential pressure of the hydraulic fluid between a connection of the second control valve facing the pedal simulator and a connection of the second control valve facing the first control valve, the non-return valve is in a closed position. Thus, a return flow of the hydraulic fluid from the pedal simulator in the direction of the brake master cylinder through the first flow controller of the second control valve can be prevented in advantageous manner.

According to an example embodiment, the second flow controller of the second control valve is formed by a throttling device, where, given the presence of a positive differential pressure of the hydraulic fluid between a connection of the second control valve facing the first control valve and a connection of the second control valve facing the pedal simulator, hydraulic fluid flows through the throttling device in the first direction of flow through the second control valve, and, given the presence of a positive differential pressure of the hydraulic fluid between a connection of the second control valve facing the pedal simulator and a connection of the second control valve facing the first control valve, hydraulic fluid flows through the throttling device in the second direction of flow through the second control valve. The throttling device of the second control valve therefore advantageously makes it possible to achieve a flow of the hydraulic fluid both in the first direction of flow and in the second direction of flow through the throttling device of a defined diameter. In this manner, a defined pressure-medium volume is advantageously able to flow in the first direction of flow or in the second direction of flow.

According to an example embodiment, the throttling device of the second control valve communicates with recesses formed in the valve seat of the second control valve or with boreholes introduced into the valve seat of the second control valve. It can thus be achieved in structurally easy manner that, when the non-return valve is in a closed position, the hydraulic fluid flows past the sealing element in the first or second direction of flow using the recesses formed in the valve seat, or via the boreholes introduced into the valve seat of the second control valve.

According to an example embodiment, the throttling device of the second control valve is formed between a housing inner wall of the second control valve and an outer surface of the sealing element of the second control valve. Advantageously, no structural changes are therefore necessary on the second control valve in order to achieve the additional function of permitting the bypass volume, that is, permitting an additional volume of the hydraulic fluid to flow in a defined direction of flow when the non-return valve is closed and likewise when the non-return valve is open.

According to an example embodiment, given the presence of a positive differential pressure of the hydraulic fluid between a connection of the second control valve facing the first control valve and a connection of the second control valve facing the pedal simulator, a first definable flow volume of the hydraulic fluid flows through the first flow controller of the second control valve and a second definable flow volume of the hydraulic fluid flows through the second flow controller of the second control valve, and, given the presence of a positive differential pressure of the hydraulic fluid between a connection of the second control valve facing the pedal simulator and a connection of the second control valve facing the first control valve, a definable flow volume of the hydraulic fluid flows solely through the second flow controller of the second control valve. A ratio of a volumetric flow through the first flow controller of the second control valve to the second flow controller of the second control valve can therefore be determined in advantageous manner. Consequently, the valve assembly is adaptable to particular structural and/or systemic requirements with respect to a desired flow rate of the hydraulic fluid in a specific defined direction.

According to an example embodiment, the first control valve is formed by a solenoid valve, preferably a directly controlled solenoid valve, which has a preliminary stage and a main stage. Therefore, the provision of the second control valve yields an advantage that a flow volume through the first and second control valve, especially in the reverse direction, that is, from the pedal simulator in the direction of the brake master cylinder, is able to be limited to a defined value to thus improve the feel of the brake pedal.

The embodiments and further developments described can be combined with each other. Additional possible embodiments, further developments, and implementations of the invention also include combinations, not explicitly named, of features of the invention described above or in the following with respect to the example embodiments. The accompanying figures are intended to facilitate a further understanding of the example embodiments of the invention. They illustrate example embodiments and, in conjunction with the description, serve to clarify principles and concepts of the invention.

Other example embodiments and many of the advantages indicated are obtained with reference to the drawings, in which the illustrated elements are not necessarily shown true to scale relative to each other, and in which, unless indicated otherwise, identical reference numerals denote identical or functionally identical elements, parts, or components.

DETAILED DESCRIPTION

Figure 1:
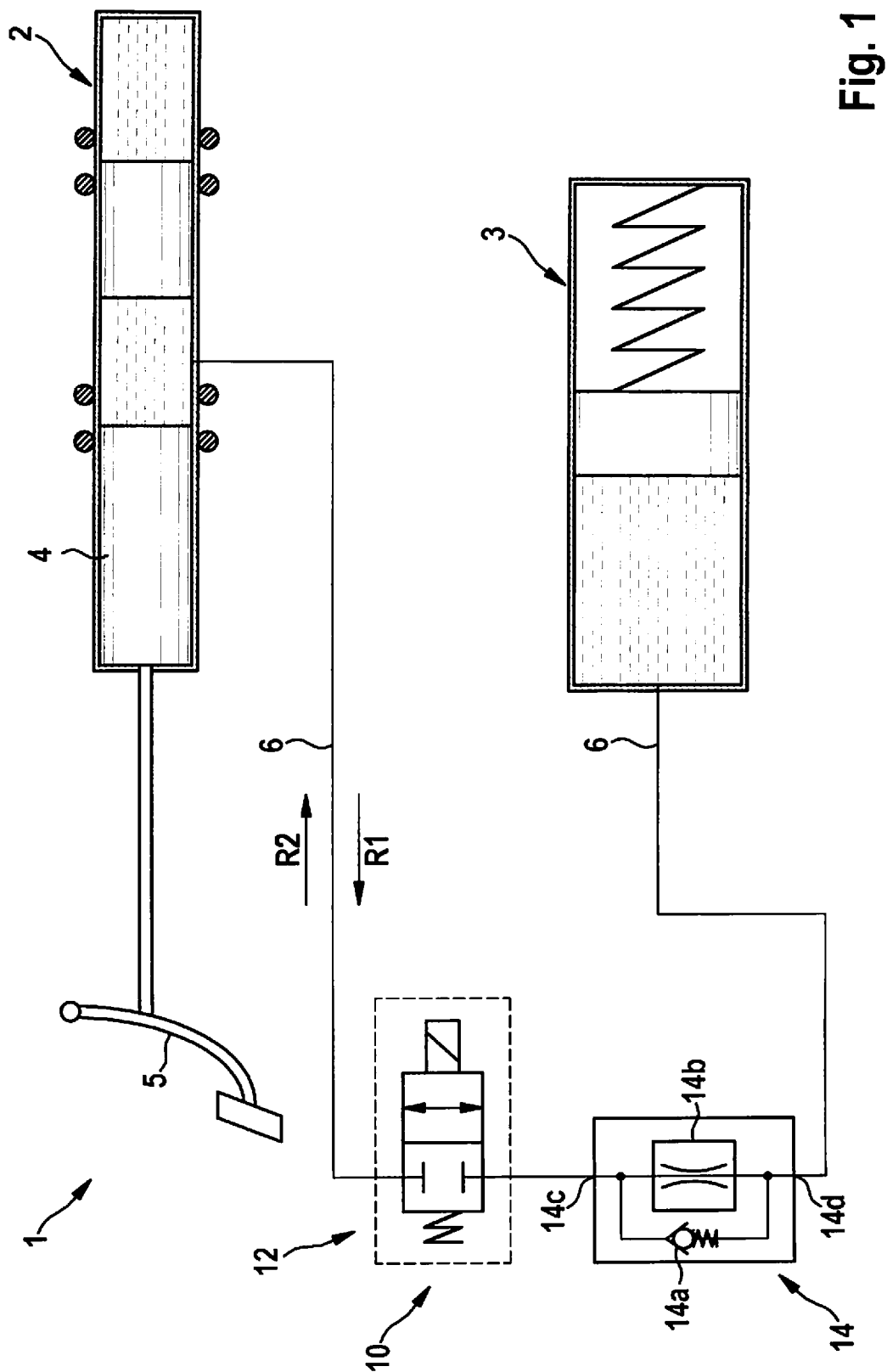
FIG. 1 shows a hydraulic connection diagram of a brake system for a motor vehicle according to an example embodiment of the present invention.

FIG. 1 shows a hydraulic connection diagram of the brake system for the motor vehicle according to an example embodiment of the present invention. Brake system 1 for the motor vehicle has a brake pedal 5 coupled via a piston 4 to a brake master cylinder 2. In addition, brake system 1 has a pedal simulator 3 connected fluidically to brake master cylinder 2. Moreover, brake system 1 has a valve assembly 10 situated between brake master cylinder 2 and pedal simulator 3. Valve assembly 10 is connected in each case by a hydraulic line 6 to brake master cylinder 2 and pedal simulator 3. Valve assembly 10 has first control valve 12 and second control valve 14. Second control valve 14 has first flow controller 14a and second flow controller 14b, each of which is designed to control a flow volume of the hydraulic fluid in first direction of flow R1 and in second direction of flow R2. In addition, second control valve 14 has a connection 14c facing first control valve 12, and a connection 14d facing the pedal simulator.

Figure 2:
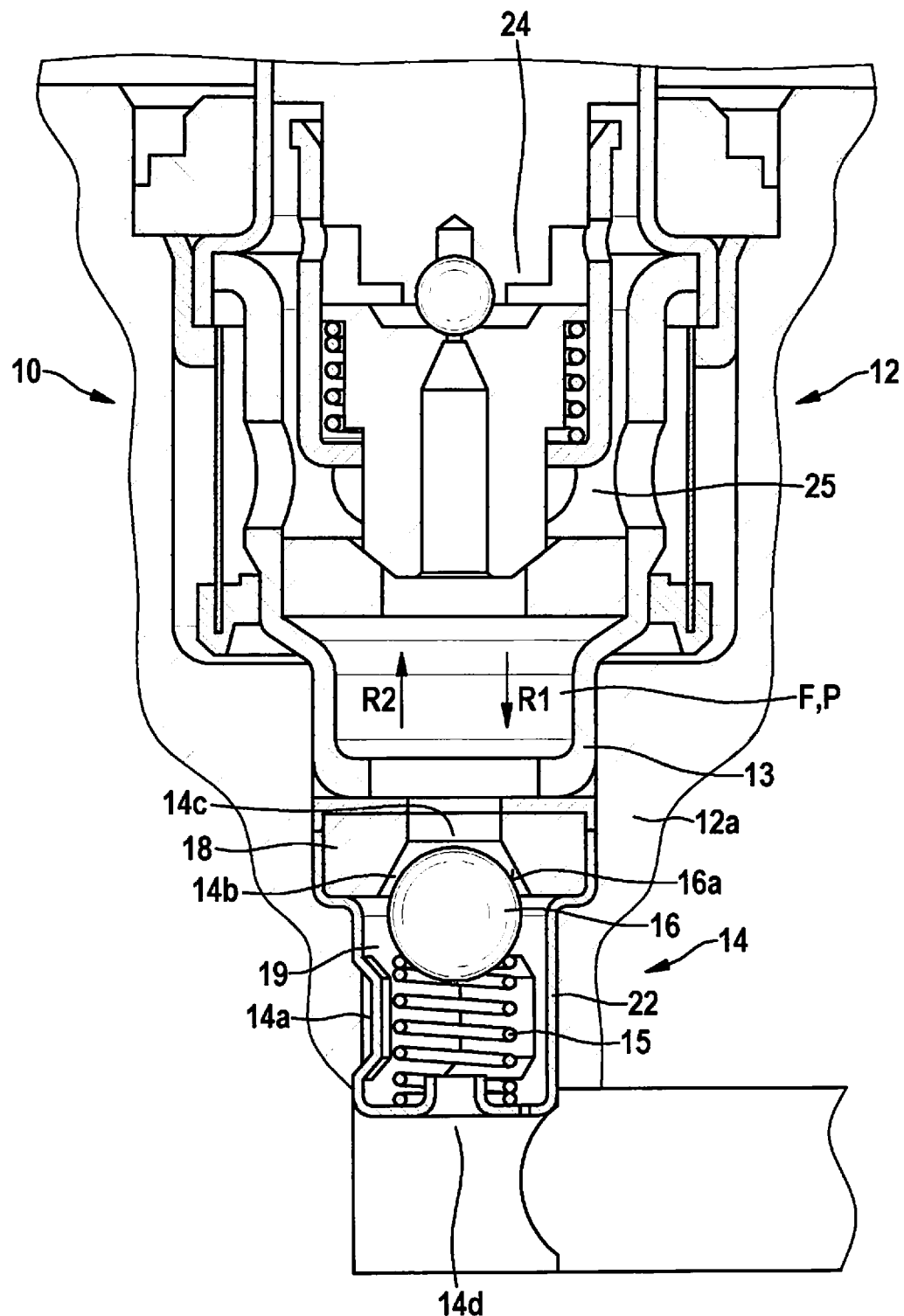
FIG. 2 is a cross-sectional view of a valve assembly for controlling a fluidic connection between a brake master cylinder and a pedal simulator of a brake system for a motor vehicle according to an example embodiment of the present invention.

FIG. 2 shows a cross-sectional view of a valve assembly for controlling a fluidic connection between a brake master cylinder and a pedal simulator of a brake system for a motor vehicle according to an example embodiment of the present invention. Valve assembly 10 for controlling the fluidic connection between the brake master cylinder (not shown in FIG. 2) and the pedal simulator of the brake system for the motor vehicle has a first control valve 12 and a second control valve 14.

First control valve 12 can be positioned between the brake master cylinder (not shown in FIG. 2) and the pedal simulator. In addition, first control valve 12 is traversable by a hydraulic fluid F in a first direction of flow R1 or in a second direction of flow R2.

Second control valve 14 is coupled to first control valve 12. Second control valve 14 can be positioned between first control valve 12 and the pedal simulator (not shown in FIG. 2). Second control valve 14 has first flow controller 14a and second flow controller 14b, each of which is designed to control a flow volume of hydraulic fluid F in first direction of flow R1 and in second direction of flow R2.

Second control valve 14 is disposed preferably at a connection 12a of first control valve 12 on the pedal-simulator side. Alternatively, second control valve 14 can be integrated into a housing 13 of first control valve 12, for example.

First flow controller 14a and second flow controller 14b of second control valve 14 for controlling the flow volume of hydraulic fluid F in first direction of flow R1 and in second direction of flow R2 are connected in parallel.

Preferably, first flow controller 14a of second control valve 14 is formed by a non-return valve. The non-return valve preferably has a sealing element 16 acted upon by a spring device 15 with a return force, the non-return valve being disposed in such a way that spring device 15 presses sealing element 16 against a valve seat 18 of second control valve 14. Sealing element 16 is formed by a sphere.

Given the presence of a positive differential pressure P of hydraulic fluid F between a connection 14c of second control valve 14 facing first control valve 12 and a connection 14d of second control valve 14 facing pedal simulator 3, positive differential pressure P being above a predetermined threshold value for opening the non-return valve, hydraulic fluid F flows in first direction of flow R1 through second control valve 14. Given the presence of a positive differential pressure P of hydraulic fluid F between a connection 14d of second control valve 14 facing pedal simulator 3 (not shown in FIG. 2) and a connection 14c of second control valve 14 facing first control valve 12, the non-return valve is in a closed position.

Second flow controller 14b of second control valve 14 is formed by a throttling device 19. Given the presence of a positive differential pressure P of hydraulic fluid F between a connection 14c of second control valve 14 facing first control valve 12 and a connection 14d of second control valve 14 facing pedal simulator 3, hydraulic fluid F flows through throttling device 19 in first direction of flow R1 through second control valve 14. Given the presence of a positive differential pressure P of hydraulic fluid F between a connection 14d of second control valve 14 facing pedal simulator 3 and a connection 14c of second control valve 14 facing first control valve 12, hydraulic fluid F flows through throttling device 19 in second direction of flow R2 through second control valve 14.

Throttling device 19 of second control valve 14 is formed between a housing inner wall 22 of second control valve 14 and an outer surface 16a of sealing element 16 of second control valve 14.

Given the presence of a positive differential pressure P of hydraulic fluid F between a connection 14c of second control valve 14 facing first control valve 12 and a connection 14d of second control valve 14 facing pedal simulator 3, a first definable flow volume of hydraulic fluid F flows through first flow controller 14a of second control valve 14 and a second definable flow volume of hydraulic fluid F flows through second flow controller 14b of second control valve 14. Given the presence of a positive differential pressure P of hydraulic fluid F at between a connection 14d of second control valve 14 facing pedal simulator 3 (not shown in FIG. 2) and a connection 14c of second control valve 14 facing first control valve 12, a definable flow volume of hydraulic fluid F flows solely through second flow controller 14b of second control valve 14.

First control valve 12 is formed by a directly controlled solenoid valve. The solenoid valve has a preliminary stage 24 and a main stage 25. Alternatively, first control valve 12 can be formed, for example, by an indirectly controlled solenoid valve or a positively controlled solenoid valve.

Figure 3:
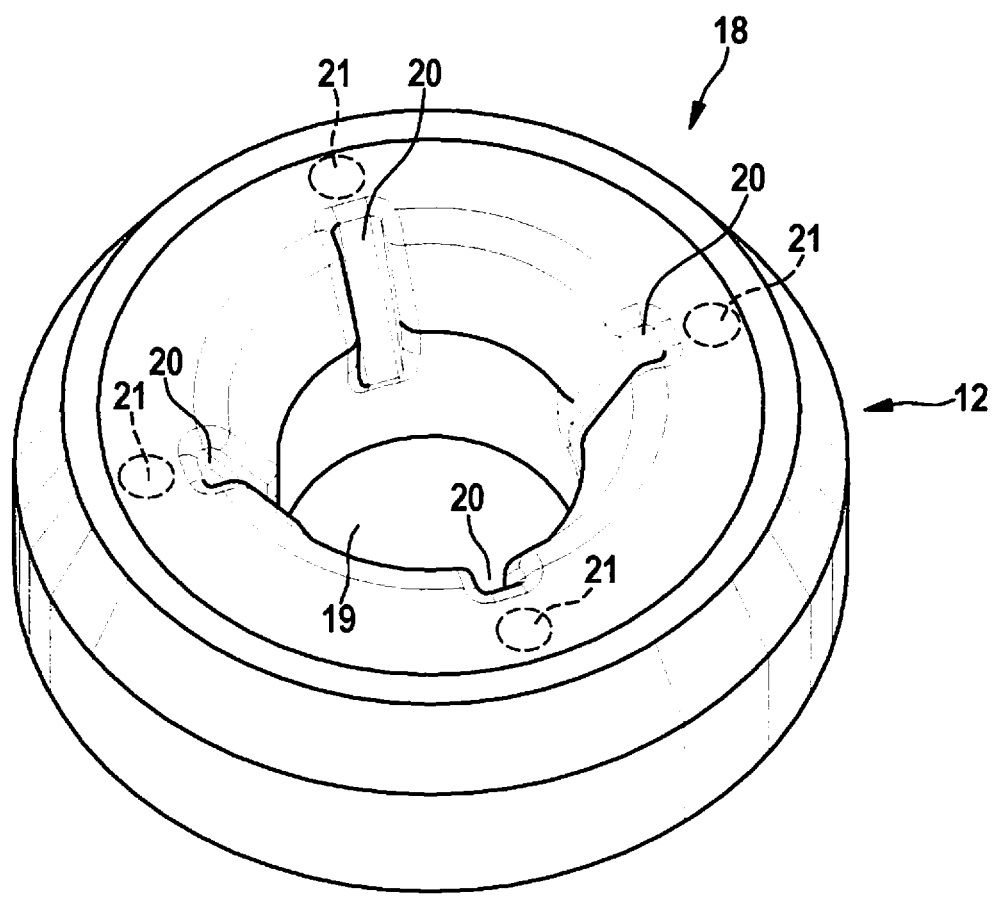
FIG. 3 is a schematic representation of a valve seat of a second control valve of a valve assembly for controlling a fluidic connection between a brake master cylinder and a pedal simulator of a brake system for a motor vehicle according to an example embodiment of the present invention.

FIG. 3 shows a schematic representation of a valve seat of a second control valve of the valve assembly for controlling the fluidic connection between the brake master cylinder and the pedal simulator of the brake system for the motor vehicle according to an example embodiment of the present invention.

Throttling device 19 of second control valve 14 (not shown in FIG. 3) is preferably in fluidic communication with recesses 20 formed in valve seat 18 of second control valve 14. Thus, both when control valve 14 is open and when closed, hydraulic fluid F is able to flow in first direction of flow R1 or in second direction of flow R2 through throttling device 19, depending on whether a positive differential pressure P is present at connection 14c of second control valve 14 facing first control valve 12, or at connection 14d of second control valve 14 facing pedal simulator 3.

Alternatively, according to an example embodiment of the present invention, instead of communicating with recesses 20 formed in valve seat 18 of second control valve 14, throttling device 19 of second control valve 14 (not shown in FIG. 3) can communicate with boreholes 21 introduced in valve seat 18 of second control valve 14.

Figure 4:
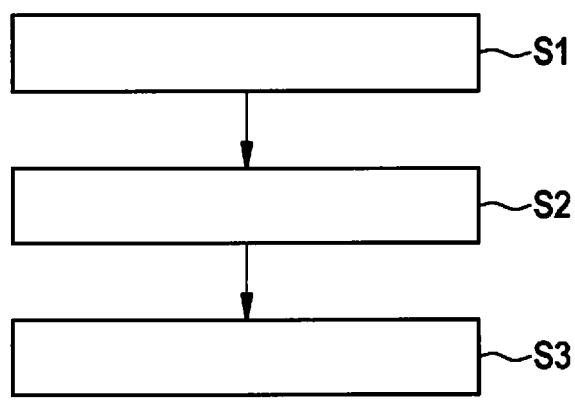
FIG. 4 is a flowchart that illustrates a method for operating the valve assembly for controlling a fluidic connection between a brake master cylinder and a pedal simulator of a brake system for a motor vehicle according to an example embodiment of the present invention.

FIG. 4 shows a flowchart of a method for operating the valve assembly for controlling the fluidic connection between the brake master cylinder and the pedal simulator of the brake system for the motor vehicle according to an example embodiment of the present invention. The method includes provision S1 of a first control valve between the brake master cylinder and the pedal simulator, a hydraulic fluid flowing through the first control valve in a first direction of flow or in a second direction of flow. The method further includes provision S2 of a second control valve coupled to the first control valve, the second control valve being provided between the first control valve and the pedal simulator. In addition, the method includes control S3 of a flow volume of the hydraulic fluid in the first direction of flow and in the second direction of flow through first and second flow controllers of the second control valve.

In the present filing documents, a positive differential pressure P of hydraulic fluid F between a first connection and a second connection of control valve 14 means that the pressure level at a first connection of this control valve 14 is higher than the pressure level at a second connection. In the case of the connections of control valve 14, a distinction is made between a connection 14c facing control valve 12 and a connection 14d facing pedal simulator 3.

Although the present invention was described above based on preferred example embodiments, it is not limited to them and is modifiable in a variety of ways. In particular, the invention can be altered or modified in varied manner without departing from the essence of the invention. For example, a configuration, specific development, and/or a geometric formation of the components used in the valve assembly can be adapted to particular structural or systemic requirements.

What is claimed is:

1. A valve assembly for controlling a fluidic connection between a brake master cylinder and a pedal simulator of a brake system for a motor vehicle, the valve assembly comprising:
    a first control valve through which a hydraulic fluid can flow between the brake master cylinder and the pedal simulator in a first direction of flow and in a second direction of flow; and
    a second control valve that includes a first flow controller and second flow controller;
    wherein:
        the first and second flow controllers are configured to control flow volumes of the hydraulic fluid that differ between the first and second directions of flow;
        with respect to the first direction of flow, which is from the brake master cylinder to the pedal simulator, the second control valve is arranged downstream from the first control valve so that, when there is a positive differential pressure of the hydraulic fluid at a first connection of the second control valve, which faces the first control valve, relative to the hydraulic fluid at a second connection of the second control valve, which faces the pedal simulator, then, at least when the positive differential pressure is above a predefined threshold value, all of the hydraulic fluid that flows through the first control valve in the first direction of flow is divided into a plurality of flows that all flow in the first direction of flow, with each respective one of all hydraulic channels in the second control valve through which the hydraulic fluid can flow having a respective one of the plurality of flows flowing the respective hydraulic channel;
        the all of the hydraulic channels in the second control valve are formed by the first and second flow controllers; and
        at least one of:
            the first and second control valves are arranged such that each of all flows of the hydraulic fluid that can flow between the first control valve and the pedal simulator flow must flow entirely through one or more of the hydraulic channels in the second control valve; and
            the all of the hydraulic channels in the second control valve, through which the plurality of flows flow, extend between the first and second connections, branching from the first connection and merging at the second connection, with no other hydraulic channel extending between the first connection to the second connection.

2. The valve assembly of claim 1, wherein the second control valve is situated between the first control valve and the pedal simulator.

3. The valve assembly of claim 1, wherein the first connection of the second control valve is at a side of the first control valve that faces the pedal-simulator.

4. The valve assembly of claim 1, wherein the second control valve is integrated into a housing of the first control valve.

5. The valve assembly of claim 1, wherein the first flow controller and the second flow controller of the second control valve are connected in parallel.

6. The valve assembly of claim 1, wherein the first flow controller of the second control valve includes a valve seat and a non-return valve that includes a spring and a seal acted upon by the spring with a return force to press the seal against the valve seat.

7. The valve assembly of claim 6, wherein the valve assembly is constructed so that:
    the non-return valve opens in response to the positive differential pressure of the hydraulic fluid at the first connection of the second control valve relative to the hydraulic fluid at the second connection of the second control valve reaching to above the predefined threshold value, thereby allowing flow of the hydraulic fluid via the non-return valve in the first direction of flow; and
    when there is a positive differential pressure of the hydraulic fluid at the second connection of the second control valve relative to the hydraulic fluid at the first connection of the second control valve, the non-return valve is in a closed position.

8. The valve assembly of claim 1, wherein the second flow controller of the second control valve is formed by a throttling device, and the valve assembly is constructed so that:
    when there is the positive differential pressure of the hydraulic fluid at the first connection of the second control valve relative to the hydraulic fluid at the second connection of the second control valve, the hydraulic fluid flows through the throttling device in the first direction of flow through the second control valve; and
    when there is a positive differential pressure of the hydraulic fluid at the second connection of the second control valve relative to the hydraulic fluid at the first connection of the second control valve, the hydraulic fluid flows through the throttling device in the second direction of flow through the second control valve.

9. The valve assembly of claim 8, wherein the throttling device of the second control valve communicates with recesses formed in the valve seat of the second control valve or with boreholes introduced into the valve seat of the second control valve.

10. A valve assembly for controlling a fluidic connection between a brake master cylinder and a pedal simulator of a brake system for a motor vehicle, the valve assembly comprising:
    a first control valve through which a hydraulic fluid can flow between the brake master cylinder and the pedal simulator in a first direction of flow and in a second direction of flow; and
    a second control valve that includes a first flow controller and second flow controller;
    wherein:
        the first and second flow controllers are configured to control flow volumes of the hydraulic fluid that differ between the first and second directions of flow;
        the second flow controller of the second control valve is formed by a throttling device;

the valve assembly is constructed so that:
  when there is a positive differential pressure of the hydraulic fluid at a connection of the second control valve facing the first control valve relative to the hydraulic fluid at a connection of the second control valve facing the pedal simulator, the hydraulic fluid flows through the throttling device in the first direction of flow through the second control valve; and
  when there is a positive differential pressure of the hydraulic fluid at the connection of the second control valve facing the pedal simulator relative to the hydraulic fluid at the connection of the second control valve facing the first control valve, the hydraulic fluid flows through the throttling device in the second direction of flow through the second control valve; and
  the throttling device of the second control valve is formed between a housing inner wall of the second control valve and an outer surface of the seal of the second control valve.

11. The valve assembly of claim 1, wherein the valve assembly is constructed so that:
when there is the positive differential pressure of the hydraulic fluid at the first connection of the second control valve relative to the hydraulic fluid at the second connection of the second control valve, a first definable flow volume of the hydraulic fluid flows through the first flow controller of the second control valve and a second definable flow volume of the hydraulic fluid flows through the second flow controller of the second control valve; and
when there is a positive differential pressure of the hydraulic fluid at the second connection of the second control valve relative to the hydraulic fluid at the first connection of the second control valve, a definable flow volume of the hydraulic fluid flows solely through the second flow controller of the second control valve.

12. The valve assembly of claim 1, wherein the first control valve includes a solenoid valve that includes a preliminary stage and a main stage.

13. The valve assembly of claim 1, wherein the first control valve includes a directly controlled solenoid valve that includes a preliminary stage and a main stage.

14. A brake system for a motor vehicle, the brake system comprising:
  a brake master cylinder;
  a brake pedal;
  a piston that couples the brake pedal to the master brake cylinder;
  a pedal simulator fluidically connected to the brake master cylinder; and
  a valve assembly configured to control the fluidic connection between the brake master cylinder and the pedal simulator:
  wherein:
    the valve assembly includes:
      a first control valve through which a hydraulic fluid can flow between the brake master cylinder and the pedal simulator in a first direction of flow and in a second direction of flow; and
      a second control valve that includes a first flow controller and a second flow controller;
    the first and second flow controllers are configured to control flow volumes of the hydraulic fluid that differ between the first and second directions of flow;
    with respect to the first direction of flow, which is from the brake master cylinder to the pedal simulator, the second control valve is arranged downstream from the first control valve so that, when there is a positive differential pressure of the hydraulic fluid at a first connection of the second control valve, which faces the first control valve, relative to the hydraulic fluid at a second connection of the second control valve, which faces the pedal simulator, then, at least when the positive differential pressure is above a predefined threshold value, all of the hydraulic fluid that flows through the first control valve in the first direction of flow is divided into a plurality of flows that all flow in the first direction of flow, with each respective one of all hydraulic channels of in the second control valve through which the hydraulic fluid can flow having a respective one of the plurality of flows flowing the respective hydraulic channel;
    the all of the hydraulic channels of in the second control valve are formed by the first and second flow controllers and
    at least one of:
      the first and second control valves are arranged such that each of all flows of the hydraulic fluid that can flow between the first control valve and the pedal simulator flow must flow entirely through one or more of the hydraulic channels in the second control valve; and
      the all of the hydraulic channels in the second control valve, through which the plurality of flows flow, extend between the first and second connections, branching from the first connection and merging at the second connection, with no other hydraulic channel extending between the first connection to the second connection.

15. The brake system of claim 14, wherein the second control valve is situated between the first control valve and the pedal simulator.

16. The brake system of claim 14, wherein the first connection of the second control valve is at a side of the first control valve that faces the pedal-simulator.

17. The brake system of claim 14, wherein:
the first flow controller of the second control valve includes a valve seat and a non-return valve that includes a spring and a seal acted upon by the spring with a return force to press the seal against the valve seat; and
the valve assembly is constructed so that:
  the non-return valve opens in response to the positive differential pressure of the hydraulic fluid at the first connection of the second control valve relative to the hydraulic fluid at the second connection of the second control valve reaching to above the predefined threshold value; and
  when there is a positive differential pressure of the hydraulic fluid at the second connection of the second control valve relative to the hydraulic fluid at the first connection of the second control valve, the non-return valve is in a closed position.

18. The brake system of claim 14, wherein the second flow controller of the second control valve is formed by a throttling device, and the valve assembly is constructed so that:
when there is the positive differential pressure of the hydraulic fluid at the first connection of the second control valve relative to the hydraulic fluid at the second connection of the second control valve, the hydraulic fluid flows through the throttling device in the first direction of flow through the second control valve; and when there is a positive differential pressure of the hydraulic fluid at the second connection of the second control valve relative to the hydraulic fluid at the first connection of the second control valve, the hydraulic fluid flows through the throttling device in the second direction of flow through the second control valve.

19. The brake system of claim 18, wherein the throttling device of the second control valve communicates with recesses formed in the valve seat of the second control valve or with boreholes introduced into the valve seat of the second control valve.

20. A brake system for a motor vehicle, the brake system comprising:
- a brake master cylinder;
- a brake pedal;
- a piston that couples the brake pedal to the master brake cylinder;
- a pedal simulator fluidically connected to the brake master cylinder; and
- a valve assembly configured to control the fluidic connection between the brake master cylinder and the pedal simulator;

wherein:
the valve assembly includes:
- a first control valve through which a hydraulic fluid can flow between the brake master cylinder and the pedal simulator in a first direction of flow and in a second direction of flow; and
- a second control valve that includes a first flow controller and a second flow controller;

the first and second flow controllers are configured to control flow volumes of the hydraulic fluid that differ between the first and second directions of flow the second flow controller of the second control valve is formed by a throttling device;

the valve assembly is constructed so that:
when there is a positive differential pressure of the hydraulic fluid at a connection of the second control valve facing the first control valve relative to the hydraulic fluid at a connection of the second control valve facing the pedal simulator, the hydraulic fluid flows through the throttling device in the first direction of flow through the second control valve; and when there is a positive differential pressure of the hydraulic fluid at the connection of the second control valve facing the pedal simulator relative to the hydraulic fluid at the connection of the second control valve facing the first control valve, the hydraulic fluid flows through the throttling device in the second direction of flow through the second control valve; and the throttling device of the second control valve is formed between a housing inner wall of the second control valve and an outer surface of the seal of the second control valve.

21. The brake system of claim 14, wherein the valve assembly is constructed so that:
when there is the positive differential pressure of the hydraulic fluid at the first connection of the second control valve relative to the hydraulic fluid at the second connection of the second control valve, a first definable flow volume of the hydraulic fluid flows through the first flow controller of the second control valve and a second definable flow volume of the hydraulic fluid flows through the second flow controller of the second control valve; and when there is a positive differential pressure of the hydraulic fluid at the second connection of the second control valve relative to the hydraulic fluid at the first connection of the second control valve, a definable flow volume of the hydraulic fluid flows solely through the second flow controller of the second control valve.

22. A method for operating the valve assembly of claim 1 for controlling the fluidic connection between the brake master cylinder and the pedal simulator of the brake system of the motor vehicle, the method comprising:
controlling flow volumes of the hydraulic fluid in the first and second directions via the first and second flow controllers of the second control valve.

* * * * *